United States Patent
Kakas et al.

(12)
(10) Patent No.: US 12,330,724 B2
(45) Date of Patent: Jun. 17, 2025

(54) STEER-BY-WIRE STEERING SYSTEM FOR A MOTOR VEHICLE

(71) Applicants: thyssenkrupp Presta AG, Eschen (LI); thyssenkrupp AG, Essen (DE)

(72) Inventors: Peter Kakas, Budapest (HU); Imre Szepessy, Mauren (LI)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 235 days.

(21) Appl. No.: 17/924,762

(22) PCT Filed: May 11, 2021

(86) PCT No.: PCT/EP2021/062397
§ 371 (c)(1),
(2) Date: Nov. 11, 2022

(87) PCT Pub. No.: WO2021/228799
PCT Pub. Date: Nov. 18, 2021

(65) Prior Publication Data
US 2023/0192186 A1    Jun. 22, 2023

(30) Foreign Application Priority Data
May 12, 2020   (DE) ............. 10 2020 205 904.7

(51) Int. Cl.
*B62D 6/00*   (2006.01)
*B62D 5/04*   (2006.01)

(52) U.S. Cl.
CPC ........... *B62D 6/008* (2013.01); *B62D 5/0409* (2013.01); *B62D 5/046* (2013.01)

(58) Field of Classification Search
CPC ....... B62D 5/0409; B62D 5/046; B62D 6/008
See application file for complete search history.

(56) References Cited

U.S. PATENT DOCUMENTS

| 6,728,615 B1 | 4/2004 | Yao et al. |
| 9,381,939 B2 * | 7/2016 | Chai ............... B62D 15/021 |

(Continued)

FOREIGN PATENT DOCUMENTS

| DE | 10248343 A1 | 8/2003 |
| DE | 10 2004 005 348 A1 | 8/2004 |

(Continued)

OTHER PUBLICATIONS

English Translation of International Search Report issued in PCT/EP2021/062397, dated Jul. 30, 2021.

*Primary Examiner* — Mark L. Greene
(74) *Attorney, Agent, or Firm* — thyssenkrupp North America, LLC

(57) ABSTRACT

A steer-by-wire steering system for a motor vehicle may include a rotatably supported steering spindle, a feedback actuator with a feedback motor for acting on the steering spindle, a steering actuator with a steering motor for acting on steered wheels of the motor vehicle based on rotation of the steering spindle, and two control units for controlling the feedback motor and the steering motor. A first control unit of the two control units and a second control unit of the two control units have different levels of complexity relative to each other, in particular such that the first control unit is more powerful than the second control unit. Also, a method can be utilized to operate such a steer-by-wire steering system, whereby the first control unit and the second control unit execute procedures of different complexity relative to each other.

14 Claims, 3 Drawing Sheets

(56) References Cited

U.S. PATENT DOCUMENTS

| | | |
|---|---|---|
| 2005/0027402 A1 | 2/2005 | Koibuchi et al. |
| 2017/0073001 A1* | 3/2017 | Oya .................... B62D 6/02 |
| 2018/0099690 A1 | 4/2018 | Oya |
| 2019/0039644 A1 | 2/2019 | Bernon-Enjalbert et al. |
| 2019/0111966 A1 | 4/2019 | Dobberphul et al. |
| 2020/0047764 A1 | 2/2020 | Yamashita et al. |

FOREIGN PATENT DOCUMENTS

| | | |
|---|---|---|
| DE | 602 11 380 T2 | 2/2007 |
| DE | 10 2016 102 259 A1 | 8/2017 |
| DE | 10 2017 218 274 A1 | 4/2019 |
| DE | 102018214900 A1 * | 3/2020 |
| EP | 3141458 A1 | 3/2017 |
| EP | 3305625 A1 | 4/2018 |

\* cited by examiner

STEER-BY-WIRE STEERING SYSTEM FOR A MOTOR VEHICLE

CROSS REFERENCE TO RELATED APPLICATIONS

This application is a U.S. National Stage Entry of International Patent Application Serial Number PCT/EP2021/062397, filed May 11, 2021, which claims priority to German Patent Application No. DE 10 2020 205 904.7, filed May 12, 2020, the entire contents of which are incorporated herein by reference.

FIELD

The present disclosure generally relates to steering systems, including steer-by-wire steering systems for motor vehicles.

BACKGROUND

In steer-by-wire steering systems, the steered wheels of the motor vehicle are not mechanically coupled to the steering input means or the steering handling device, such as a steering wheel. The position of the steering wheel is therefore not transferred purely mechanically to the position of the steered wheels. Rather, a steering wheel rotation is also transmitted via electrical signals into a corresponding deflection of the steered wheels. For this purpose, a steer-by-wire steering system comprises a device for detecting the driver's steering input or the steering wheel angle or the steering wheel rotation, in particular a steering angle sensor, a device for the electrical transmission of the detected driver's steering input, in particular a data cable or a bus system, and a device for the implementation of the electrically forwarded driver's steering input, in particular a steering actuator or steering controller.

It is known to set up the control units for controlling the feedback motor and the steering motor, in particular a feedback control unit and a steering control unit, in each case in such a way that they communicate with each other, that is, exchange data. The known feedback control units and steering control units are designed redundantly to each other and are similar in terms of design and function. For example, reference is made to DE 10 2004 005 348 A1.

Thus a need exists for a more cost-effective steer-by-wire steering system where functionality is not reduced.

DETAILED DESCRIPTION

Figure 1:
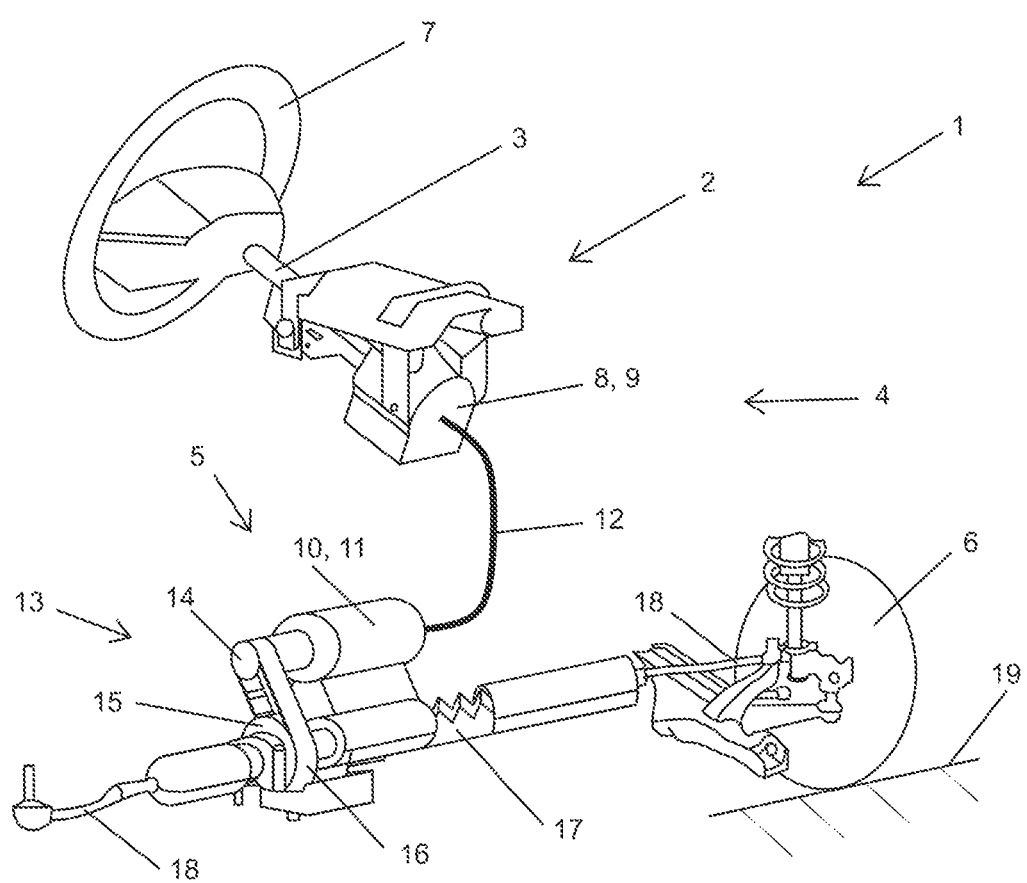
FIG. 1 is a schematic, perspective view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a steer-by-wire steering system for a motor vehicle. In some examples, such a steer-by-wire steering system includes a rotatably supported steering spindle, a feedback actuator for acting on the steering spindle, a steering actuator with a steering motor for acting on the steered wheels of the motor vehicle according to the rotation of the steering spindle and two control units for controlling the feedback motor and the steering motor. Furthermore, the present disclosure generally relates to a method for operating a steer-by-wire steering system.

The proposed steer-by-wire steering system includes a rotatably supported steering spindle, a feedback actuator with a feedback motor to act on the steering spindle, a steering actuator with a steering motor to act on the steered wheels of the motor vehicle according to the rotation of the steering spindle and two control units for controlling the feedback motor and the steering motor, wherein a first control unit of the two control units and a second control unit of the two control units have different levels of complexity relative to each other. In particular, it is provided that the two control units are a feedback control unit for controlling the feedback motor and a steering control unit for controlling the steering motor. According to an advantageous design, the feedback actuator comprises the feedback control unit. According to a further advantageous design, the steering actuator comprises the steering control unit.

Advantageously, the first control unit and the second control unit are connected to each other for the exchange of signals, i.e. in particular connected by means of communication technology. In particular, it is provided that the first control unit is designed to send signals to the second control unit and to receive signals from the second control unit. Furthermore, it is provided in particular that the second control unit is designed to send signals to the first control unit and to receive signals from the first control unit. Advantageously, the first control unit and the second control unit each have a communication interface. In particular, it is provided that the first control unit and the second control unit are carried out via a communication bus. The transmission of signals between the first control unit and the second control unit can be wired and/or wireless.

Due to the different levels of complexity of the control units, it is possible to design the steer-by-wire steering system in such a way that specific tasks can be assigned to each control unit. Each control unit can be selected, dimensioned or configured according to its requirements within the steer-by-wire steering system. This results in cost advantages, because the control units do not have to be equally powerful, but one of the two control units can advantageously be significantly less powerful than the other control unit. In particular, in the case of a communication connection between the first control unit and the second control unit, execution steps, in particular computing operations, for the generation of control signals can be advantageously transferred from one control unit to the other control unit.

The feedback actuator of the steer-by-wire steering system is used in particular to introduce a torque into the steering spindle, wherein the torque depends on the mechanical loads acting on the steered vehicle wheels. These mechanical loads include, for example, frictional forces between the vehicle wheels and the road, which depend on the road surface and ground conditions, and shocks due to bumps and potholes.

The steering actuator of the steer-by-wire steering system is used in particular to adjust the angle of the steered vehicle wheels according to the rotation of the steering spindle, i.e. according to the steering command.

In an advantageous manner, the first control unit and the second control unit have different levels of software complexity and/or hardware complexity relative to each other. The term software includes the terms computer program and source code.

Software complexity can be defined as a measure based on a metric, wherein the metric is a function applicable to software quantifying software in the form of a measure, wherein the measure represents a software property. The quantifying function is in particular a mathematical function. The properties of software are in particular the size of the source code, preferably the number of lines or characters of the source code, the functional scope of the source code, the maintainability of the source code, the extensibility of the source code and/or the comprehensibility of the source code. Examples include the Chapins Data metric, the Elshofs Data Flow metric, the Cards Data Access metric, the Henrys Interface metric, the McCabe metric or cyclomatic complexity, the McClures Decision metric, the Sneeds Branching metric, and the Halstead metric.

Alternatively, software complexity can be defined as a measure based on the algorithmic information content of software. An example of this is the Kolmogorov complexity or algorithmic complexity or description complexity. Further alternatively, the software complexity may be defined as a measure based on the resource consumption of software, in particular the number of computing operations, the computing time, the storage space and/or the electrical power consumption. Even further alternatively, the software complexity may be defined as a measure based on the functional scope of software, in particular the functionality, the number of possible input signals and/or the number of possible output signals. It is also conceivable and possible to define software complexity as a combination of two or more of the aforementioned definitions of software complexity.

Hardware complexity may be defined as a measure that depends on the number of components, in particular memory units, switches, filters and computing units, in particular processors, within a control unit. In particular, it is provided that the first control unit comprises more powerful hardware than the second control unit.

In a further advantageous manner, the mutually different levels of complexity of the first control unit and the second control unit are formed by mutually different computational capabilities or efficiencies. An advantageous design provides that the first control unit comprises a first computing unit and the second control unit comprises a second computing unit, wherein the first computing unit is designed to perform more computing operations per unit of time than the second computing unit. This results in cost advantages with regard to the second control unit.

Further advantageously, it is provided that the first control unit is designed for the execution of high-level software and the second control unit for the execution of low-level software. In particular, the second control unit is not designed to execute high-level software. This also makes it possible to implement the second control unit more cost-effectively.

A further advantageous embodiment provides that the first control unit is incorporated into the determination of a motor control signal for controlling the feedback motor and the steering motor, and the second control unit is incorporated into the determination of a motor control signal for controlling the feedback motor or the steering motor. In particular, the second control unit performs only lower operations compared to the first control unit. Advantageously, the second control unit, which is in particular less powerful than the first control unit, processes received signals, in particular signals from angle sensors, torque sensors, current measurement signals and/or voltage signals. In particular, an analog-to-digital conversion of these signals may be provided by the second control unit. The signals are then advantageously passed on from the second control unit to the first control unit for further use, in particular further processing. Advantageously, the first control unit is also designed to process received signals, in particular signals from angle sensors, torque sensors, current measurement signals and/or voltage signals, and in particular to convert analog signals into digital signals. These signals as well as the signals transmitted by the second control unit are advantageously processed by the first control unit, in particular for the generation of control signals for the feedback motor of the feedback actuator and the steering motor of the steering actuator.

In particular, it is provided that the first control unit is designed to receive first sensor signals, in particular signals from at least one angle sensor and/or at least one torque sensor, to process the first sensor signals, in particular by an analog-digital conversion, and to determine a first motor control signal from the processed first sensor signals. Depending on the assignment of the first control unit and the second control unit, the first motor control signal is a control signal for the feedback motor of the feedback actuator or a control signal for the steering motor of the steering actuator. The second control unit is advantageously designed to receive, process, in particular by an analog-digital conversion, second sensor signals, in particular signals from at least one further angle sensor and/or at least one further torque sensor, and to forward the processed second sensor signals to the first control unit. Advantageously, the first control unit is further developed to receive the processed second sensor signals and to determine a second motor control signal from the processed second sensor signals. Depending on the assignment of the first control unit and the second control unit, the second motor control signal is a control signal for the steering motor of the steering actuator or a control signal for the feedback motor of the feedback actuator. Further advantageously, the first control unit is also designed to forward the determined second motor control signal to the second control unit. The second control unit is designed in particular to receive the second motor control signal and to provide it for controlling the steering motor of the steering actuator or for controlling the feedback motor of the feedback actuator.

It may be provided that the first control unit is further designed to take over the function of the second control unit in the event of a failure of the second control unit. In particular, it is provided that the first control unit controls both the feedback motor of the feedback actuator and the steering motor of the steering actuator in this case.

According to one embodiment, it is provided that the first control unit is designed for controlling the feedback motor and the second control unit is designed for controlling the steering motor. Advantageously, the first control unit comprises feedback platform software, feedback application software and control application software. The second control unit comprises in particular steering platform software. In particular, the second control unit does not comprise any feedback platform software, any feedback application software or any steering application software.

A design variant provides that the first control unit is designed for controlling the steering motor and the second control unit is designed for controlling the feedback motor. Advantageously, the first control unit comprises steering platform software, steering application software and feedback application software. The second control unit includes in particular feedback platform software. In particular, the second control unit does not include any steering platform software, any steering application software or any feedback application software.

The feedback platform software and the steering platform software are advantageously each designed to implement hardware-related, user-remote instructions. The feedback application software and the steering application software are advantageously each designed to implement hardware-remote, user-oriented instructions. In particular, it is provided that the feedback platform software and the steering platform software are low-level software. Furthermore, it is provided in particular that the feedback application software and the steering application software are high-level software.

According to an embodiment in which the control units are in the form of a feedback control unit and a steering control unit, the feedback control unit has a lower level of complexity than the steering control unit. The feedback control unit may be designed to carry out tasks from a smaller and/or less computationally intensive range of tasks. The steering control unit, on the other hand, may be designed to carry out tasks from a larger and/or more computationally intensive range of tasks.

Advantageously, the feedback control unit comprises feedback platform software and the steering control unit comprises steering platform software as well as steering application software.

The feedback platform software and the steering platform software may each be designed to implement hardware-related, user-remote instructions of the steering control unit. The feedback platform software and the steering platform software may each be software that is lower ranking in terms of the software architecture than application software, in particular than the steering application software. The hardware-related, user-remote instructions of the steering control unit can be implemented according to sensor values which represent the steering command, in particular steering command angles and steering command torques. It is also provided in particular to calculate a steering command torque and to control the steering motor according to the steering command torque.

The steering application software may be designed to implement hardware-remote, user-oriented instructions of the steering control unit. The steering application software may be higher-ranking software in terms of the software architecture than platform software, especially than the feedback platform software and the steering platform software.

According to a further embodiment, the steering control unit has a lower level of complexity than the feedback control unit. The steering control unit may be designed to carry out tasks from a smaller and/or less computationally intensive range of tasks. The feedback control unit, on the other hand, can be designed to carry out tasks from a larger and/or more computationally intensive range of tasks.

Advantageously, the steering control unit comprises steering platform software and the feedback control unit comprises feedback platform software as well as feedback application software.

The steering platform software and the feedback platform software may each be designed to implement hardware-related, user-remote instructions of the feedback control unit. The steering platform software and the feedback platform software may each be software that is lower ranking than application software in terms of the software architecture, especially the feedback application software. The hardware-related, user-remote instructions of the feedback control unit can be implemented according to sensor values which represent the mechanical loads acting on the vehicle wheels, in particular forces and torques. It is also provided in particular to calculate a feedback torque and to control the feedback motor according to the feedback torque.

The feedback application software may be designed to implement remote, user-oriented instructions of the feedback control unit. The feedback application software may be higher-ranking software in terms of software architecture than platform software, especially than the steering platform software and the feedback platform software.

The feedback control unit and the steering control unit are preferably each designed to exchange information. The feedback control unit and the steering control unit preferably exchange information via an information interface.

Further advantageously, it is provided that the first control unit has an interface for connecting the first control unit to a communication bus of a motor vehicle. Of the first control unit and the second control unit, advantageously only the first control unit is designed to exchange signals via the communication bus, in particular signals with further control units of the motor vehicle and/or other signaling devices of the motor vehicle.

In addition, preferably the feedback motor and the steering motor each have one or more coils.

The method for operating a steer-by-wire steering system, in particular a steer-by-wire steering system according to the invention, which is also proposed for achieving the object of the present invention, provides that the first control unit and the second control unit perform procedures of different levels of complexity from each other. In particular, a feedback control unit and a steering control unit are provided as control units, wherein the feedback control unit and the steering control unit execute procedures of different levels of complexity from each other.

According to one embodiment, the steering control unit performs all calculations of the feedback control unit and the steering control unit, wherein the feedback control unit receives and executes the results calculated by the steering control unit.

According to a further embodiment, the feedback control unit performs all calculations of the steering control unit and the feedback control unit, wherein the steering control unit receives and executes the results calculated by the feedback control unit.

In particular, it is provided that the first control unit performs all calculations for the determination of a first motor control signal and all calculations for the determination of a second motor control signal. The first control unit advantageously forwards the results of the calculations for the determination of the second motor control signal to the second control unit. The second control unit, which in particular does not carry out these calculations, i.e. in particular not all calculations for the determination of a first motor control signal and all calculations for the determination of a second motor control signal, instead advantageously receives the results of the calculations for the determination of the second motor control signal and provides the second motor control signal, in particular for controlling the feedback motor or the steering motor.

According to an advantageous embodiment of the invention, the first control unit receives first sensor signals, the first control unit advantageously processes the first sensor signals and advantageously the first control unit determines a first motor control signal from the processed first sensor signals. The second control unit advantageously receives second sensor signals. In particular, the second control unit processes the received sensor signals and advantageously forwards the processed second sensor signals to the first control unit. Further advantageously, the first control unit then receives the processed second sensor signals and advantageously determines a second motor control signal from the processed second sensor signals.

Advantageously, the first control unit then forwards the determined second motor control signal to the second control unit. The second control unit then advantageously controls the feedback motor or the steering motor with the received second motor control signal. With the first motor control signal, the first control unit advantageously controls the steering motor or the feedback motor.

In particular, it is provided as one embodiment that the first control unit is assigned to the feedback actuator and the second control unit is assigned to the steering actuator, wherein the first motor control signal is a signal for controlling the feedback motor and the second motor control signal is a signal for controlling the steering motor.

As a further embodiment, it is provided that the first control unit is assigned to the steering actuator and the second control unit is assigned to the feedback actuator, wherein the first motor control signal is a signal for controlling the steering motor and the second motor control signal is a signal for controlling the feedback motor.

In the different figures the same parts are always provided with the same reference signs and are therefore usually only named or mentioned once.

FIG. 1 shows an embodiment of a steer-by-wire steering system 1 designed according to the invention in a perspective, schematic representation from diagonally in front in the direction of vehicle travel, wherein non-essential components are not shown for the sake of an improved overview for the description of the invention.

The steer-by-wire steering system 1 suitable for a motor vehicle, in particular for a passenger car, comprises a steering column 2 in which a steering spindle 3 is rotatably supported, a feedback actuator 4 for acting on the steering spindle 3 and a steering actuator 5 for acting on the steered wheels 6 of the motor vehicle according to the rotation of the steering spindle 2. A steering wheel 7 for entering a driver's steering input is attached to the end of the steering spindle 3 facing towards the driver. The feedback actuator 4 has a feedback motor 8 and a feedback control unit 9 for controlling the feedback motor 8. The steering actuator 5 has a steering motor 10 and a steering control unit 11 for controlling the steering motor 10.

To enable data exchange between the feedback actuator 4, in particular the feedback control unit 9, and the steering actuator 5, in particular the steering control unit 11, a data transmission device 12 in the form of a data cable connects the feedback actuator 4 to the steering actuator 5. The data transmission device 12 transmits data bidirectionally, i.e. both starting from the feedback actuator 4 in the direction of the steering actuator 5 (direction of steering input) and—vice versa—starting from the steering actuator 5 in the direction of the feedback actuator 4 (feedback direction).

In the direction of the steering input, the driver's steering input can be detected by sensor on or in the steering column 2. The sensor data relates in particular to the steering angle and steering torque. The sensor data can be transmitted via the data transmission device 12 to the steering actuator 5 acting as a final control element.

A belt gear 13 is connected to the steering actuator 5 and arranged on it. The belt gear 13 comprises a belt drive wheel 14, a belt output wheel 15 and a drive belt 16 connecting, i.e. mechanically coupling, the belt drive wheel 14 to the belt output wheel 15. The drive belt 16 is a toothed belt, wherein other types of belts can also be used, such as flat belts or V-belts. The belt output wheel 15 is torsionally coupled to a screw gear for the translation of a rotational movement into a translational movement. The screw gear is a ball screw, wherein other types of screw gears can also be used The steering motor 10 drives the belt drive wheel 14 rotationally, so that the belt drive wheel 14 sets the belt output wheel 15 in rotation via the drive belt 16, so that the belt output wheel 15 sets a coupling rod 17 in translation along its longitudinal axis via the screw gear. The coupling rod 17, which moves linearly along its longitudinal axis, is mechanically coupled to a tie rod 18 on both sides of the motor vehicle. The tie rods 18 are in turn mechanically coupled to the vehicle wheels 6. An introduced driver's steering input can be transferred to the vehicle wheels 6 due to the described electromechanical connection.

In the feedback direction, mechanical information can be detected by sensors on or in the steering actuator 5, the belt gearbox 13, the screw gearbox, the coupling rod 17, the tie rods 18 and/or the vehicle wheels 6. These may be, for example, vibrations on the aforementioned structures caused by corrugations, potholes and/or roughness of a road 19 while driving and a mechanical resistance generated by the road surface, the road inclination and/or by cornering during steering. The driver can be given an impression of the condition of the road surface by means of haptic or tactile feedback, i.e. by applying torques corresponding to the mechanical information (feedback torques) to the steering spindle 3.

The feedback control unit 9 and the steering control unit 11 have different levels of complexity relative to each other.

Figure 2:
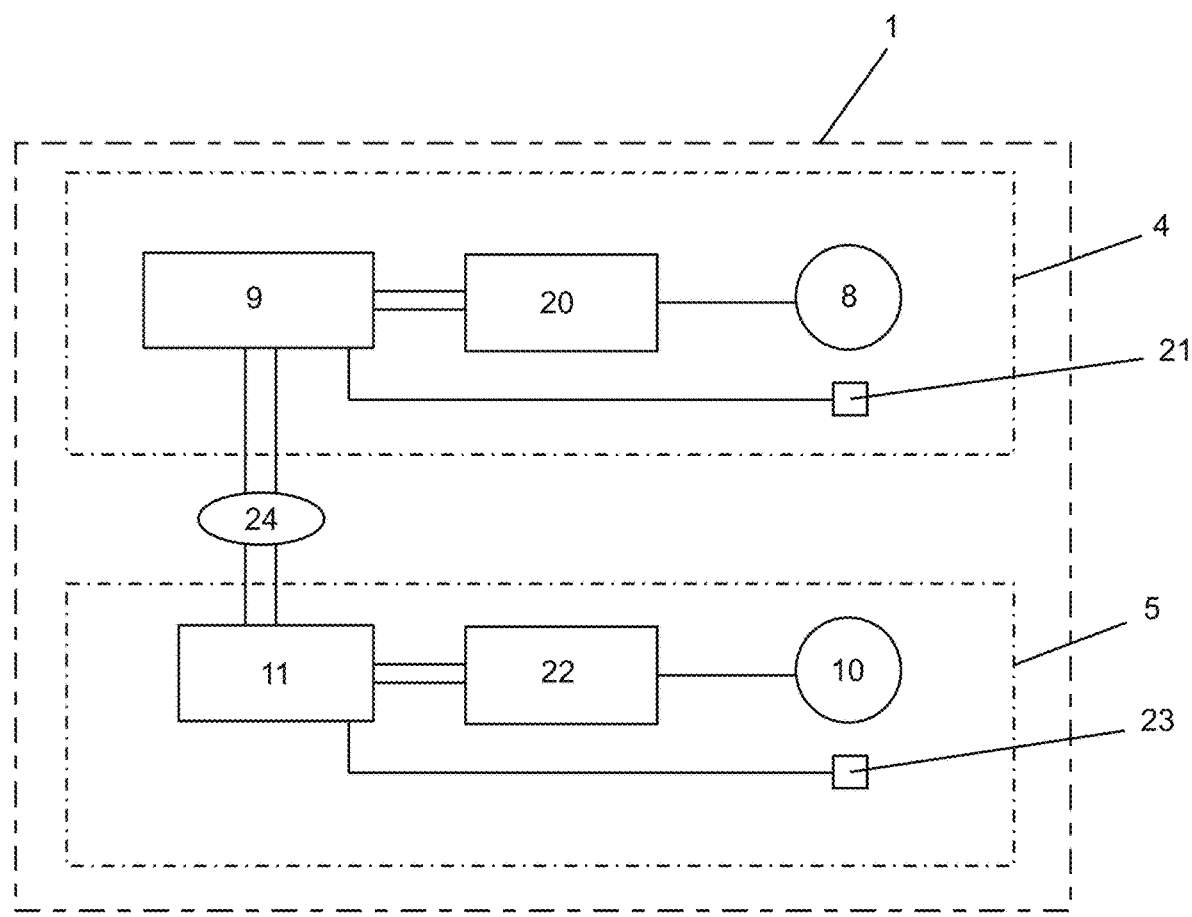
FIG. 2 is a simplified block diagram of the steer-by-wire steering system from FIG. 1.

FIG. 2 shows the steer-by-wire steering system 1 from FIG. 1 in the form of a greatly simplified block diagram.

As described in connection with FIG. 1, the steer-by-wire steering system 1 comprises the feedback actuator 4 and the steering actuator 5, wherein the feedback actuator 4 comprises the feedback motor 8 and the feedback control unit 9, and wherein the steering actuator 5 comprises the steering motor 10 and the steering control unit 11.

The feedback motor 8 is used to introduce feedback torques into the steering spindle 3, which is not shown in FIG. 2. The feedback actuator 4 also has a feedback inverter 20 and a feedback sensor 21. The feedback inverter 20 connects the feedback motor 8 and the feedback control unit 9 electrically to each other and serves as an intermediate power stage when the feedback motor 8 is controlled by the feedback control unit 9. The feedback sensor 21 is set up to monitor the status of the feedback motor 8 and to transmit information regarding the status of the feedback motor 8 to the feedback control unit 9.

The steering motor 10 is used to generate driver steering input torques, i.e. torques that correspond to the sensor-detected driver steering inputs. A generated driver's steering input torque is converted into a linear movement of the coupling rod 17 by the mechanical coupling of the belt drive wheel 14 to the coupling rod 17. Due to the mechanical coupling of the coupling rod 17 in turn to the steered wheels 6, the wheels 6 are steered according to the driver's steering input. The steering actuator 5 also has a steering inverter 22 and a steering sensor 23. The steering inverter 22 connects the steering motor 10 and the steering control unit 11 electrically to each other and serves as an intermediate power stage when the steering motor 10 is controlled by the steering control unit 11. The steering sensor 23 is set up to monitor the condition of the steering motor 10 and to transmit information regarding the condition of the steering motor 10 to the steering control unit 11.

The feedback control unit 9 and the steering control unit 11 are each designed to exchange information via an information interface 24. The feedback control unit 9 receives the first signals from a torque sensor that is not explicitly illustrated and a rotation angle sensor that is also not explicitly illustrated. The feedback control unit 9 processes these first signals and determines a control signal for the feedback motor 8 from the processed first signals. The steering control unit 11 receives second signals from a torque sensor that is also not explicitly illustrated and a rotation angle sensor that is also not explicitly illustrated. The steering control unit 11 processes the received second signals and forwards them via the information interface 24 to the feedback control unit 9. The feedback control unit 9 receives the processed second signals via the information interface 24 and determines from these a control signal for controlling the steering motor 10. The feedback control unit 9 forwards the control signal for controlling the steering motor 10 via the information interface 24 to the steering control unit 11, which receives the control signal for controlling the steering motor 10. The steering control unit 11 controls the steering motor 10 with the received control signal for controlling the steering motor 10. The feedback control unit 9 controls the feedback motor 8 with the determined control signal for the feedback motor 8. The steering control unit 11 has a lower level of complexity than the feedback control unit 9 in that the steering control unit 11 itself is not designed to determine the control signal for controlling the steering motor 10.

Figure 3:
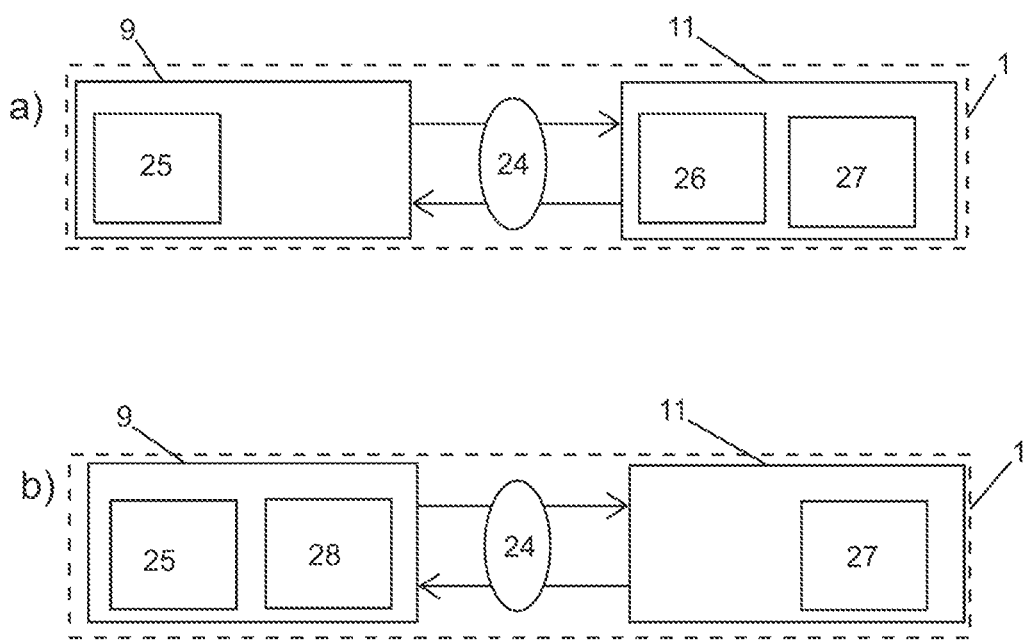
FIGS. 3a and 3b show simplified block diagrams of additional example steer-by-wire steering systems.

FIG. 3 a) shows a further embodiment of a steer-by-wire steering system 1 according to the invention in the form of a highly simplified block diagram.

As described in connection with FIG. 1 and FIG. 2, the steer-by-wire steering system 1 comprises the feedback control unit 9 and the steering control unit 11. The feedback control unit 9 and the steering control unit 11 are each designed to exchange information via the information interface 24.

In contrast to known steer-by-wire steering systems, in which the feedback control units and the steering control units are essentially identically complex in terms of design and function, in particular have an essentially identical software complexity, in particular both have both application software and platform software, the feedback control unit 9 and the steering control unit 11 have different software levels of complexity relative to each other. The feedback control unit 9 has a lower level of software complexity than the steering control unit 11. The feedback control unit 9 comprises a feedback platform software 25. The steering control unit 11, on the other hand, comprises both a steering application software 26 and a steering platform software 27. The feedback platform software 25 and the steering platform software 27 are each designed to implement hardware-related, user-remote instructions. For this purpose, the feedback platform software 25 and the steering platform software 27 are each designed to implement instructions of the steering application software 26. The steering application software 26 is designed to implement hardware-remote, user-oriented instructions. In particular, the steering application software 26 also includes the functions of feedback application software, so that advantageously a signal for controlling the feedback motor 8 is calculated by means of the steering application software 26. In contrast to known steer-by-wire steering systems, in which each control unit has its own application software adapted to the requirements of the respective control unit, the steering application software 26 acts as the common application software of the feedback actuator 4 and the steering actuator 5. Since the two control units 9, 11 are connected to each other via the information interface 24, only a single application software is required, namely in this version the steering application software 26.

FIG. 3 b) shows a further embodiment of a steer-by-wire steering system 1 according to the invention in the form of a highly simplified block diagram.

The feedback control unit 9 and the steering control unit 11 have different levels of software complexity relative to each other. The steering control unit 11 has a lower level of software complexity than the feedback control unit 9. The steering control unit 11 comprises a steering platform software 27. The feedback control unit 9, on the other hand, comprises both a feedback platform software 25 and a feedback application software 28. The feedback platform software 25 and the steering platform software 27 are each designed to implement hardware-related, user-remote instructions. For this purpose, the feedback platform software 25 and the steering platform software 27 are each designed to implement instructions of the feedback application software 28. The feedback application software 28 is designed to implement hardware-remote, user-oriented instructions. In particular, the feedback application software 28 also includes the functions of steering application software, so that advantageously a signal for controlling the steering motor 10 is calculated by means of the feedback application software 28. In contrast to known steer-by-wire steering systems, in which each control unit has its own application software adapted to the requirements of the respective control unit, the feedback application software 28 acts as the common application software of the feedback actuator 4 and the steering actuator 5. Since the two control units 9, 11 are connected to each other via the information interface 24, only a single application software is required, namely in this version the feedback application software 28.

LIST OF REFERENCE SIGNS

1 Steer-by-wire steering system
2 Steering column
3 Steering spindle
4 Feedback actuator
5 Steering actuator
6 Vehicle wheel
7 Steering wheel
8 Feedback motor
9 Feedback control unit
10 Steering motor
11 Steering control unit
12 Data transmission device
13 Belt drive
14 Belt drive wheel
15 Belt output wheel 16 Drive belt
17 Coupling rod
18 Tie rod
19 Road
20 Feedback inverter
21 Feedback sensor
22 Steering inverter
23 Steering sensor
24 Information interface
25 Feedback platform software
26 Steering application software
27 Steering platform software
28 Feedback application software

What is claimed is:

1. A steer-by-wire steering system for a motor vehicle, comprising:
    a steering spindle that is rotatably supported;
    a feedback actuator with a feedback motor for acting on the steering spindle;
    a steering actuator with a steering motor for acting on steered wheels of the motor vehicle based on rotation of the steering spindle; and
    control units for controlling the feedback motor and the steering motor, wherein a first control unit and a second control unit of the control units have different levels of complexity;
    wherein the first control unit is configured to receive first sensor signals, to process the first sensor signals, and to determine a first motor control signal from the first sensor signals that have been processed, wherein the second control unit is configured to receive second sensor signals, to process the second sensor signals, and to forward the second sensor signals that have been processed to the first control unit, wherein the first control unit is configured to receive the second sensor signals that have been processed and to determine a second motor control signal from the second sensor signals that have been processed wherein the control units are configured to control the feedback and steering motors based on the motor control signals.

2. The steer-by-wire steering system of claim 1 wherein the first and second control units have different levels of software complexity and/or hardware complexity.

3. The steer-by-wire steering system of claim 1 wherein the first and second control units are connected to each other for exchanging signals.

4. The steer-by-wire steering system of claim 1 wherein the first control unit comprises more powerful hardware than the second control unit.

5. The steer-by-wire steering system of claim 4 wherein the first control unit comprises a first computing unit and the second control unit comprises a second computing unit, wherein the first computing unit is configured to perform more computing operations per unit of time than the second computing unit.

6. The steer-by-wire steering system of claim 1 wherein the first control unit is configured for executing high-level software and the second control unit is configured for executing low-level software.

7. The steer-by-wire steering system of claim 1 wherein the first control unit is configured to forward the second motor control signal that has been determined to the second control unit.

8. The steer-by-wire steering system of claim 1 wherein the first control unit is configured to assume a function of the second control unit in an event of a failure of the second control unit.

9. The steer-by-wire steering system of claim 1 wherein the first control unit is configured to control the feedback motor and the second control unit is configured to control the steering motor.

10. The steer-by-wire steering system of claim 1 wherein the first control unit is configured for controlling the steering motor and the second control unit is configured for controlling the feedback motor.

11. The steer-by-wire steering system of claim 1 wherein the first control unit includes an interface for connecting the first control unit to a communication bus of a motor vehicle, wherein of the first control unit and the second control unit only the first control unit is configured to exchange signals via the communication bus.

12. A method for operating the steer-by-wire steering system of claim 1, the method comprising causing the first control unit and the second control unit to execute procedures of different complexity relative to each other; wherein the first control unit receives first sensor signals, processes the first sensor signals, and determines a first motor control signal from the first sensor signals that have been processed, wherein the second control unit receives second sensor signals, processes the second sensor signals, and forwards the second sensor signals that have been processed to the first control unit, wherein the first control unit receives the second sensor signals that have been processed and determines a second motor control signal from the second sensor signals that have been processed.

13. The method of claim 12 wherein the first control unit forwards the second motor control signal that has been determined to the second control unit.

14. The method of claim 12 wherein at least one of:
    the first control unit is assigned to the feedback actuator and the second control unit is assigned to the steering actuator, wherein the first motor control signal is a signal for controlling the feedback motor and the second motor control signal is a signal for controlling the steering motor; or
    the first control unit is assigned to the steering actuator and the second control unit is assigned to the feedback actuator, wherein the first motor control signal is a signal for controlling the steering motor and the second motor control signal is a signal for controlling the feedback motor.

* * * * *